United States Patent Office 3,651,178
Patented Mar. 21, 1972

3,651,178
POLYMERCAPTO CHLORIDO POLYPHOSPHONITE
Kenneth Rattenbury, Morgantown, W. Va., assignor to Weston Chemical Corporation, New York, N.Y.
No Drawing. Filed June 24, 1969, Ser. No. 836,149
Int. Cl. C07f 9/18, 9/20
U.S. Cl. 260—928    9 Claims

ABSTRACT OF THE DISCLOSURE

Compounds are prepared of the formula

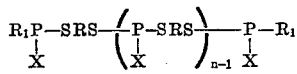

where $n$ is an integer of 1 to 10, X is chlorine or bromine, $R_1$ is alkyl, haloalkyl, aryl, haloaryl, alkenyl, aralkyl, haloalkenyl, or cycloalkyl, and R is a divalent aromatic, aliphatic or cycloaliphatic group.

---

The compounds are useful as desiccants and as intermediates in the preparation of polythiophosphonites.

The present invention relates to novel chlorothiophosphonites.

The compounds have the general formula

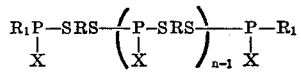

where $n$ is an integer of at least 1 and preferably not over 10, X is chlorine or bromine, $R_1$ is alkyl, haloalkyl, aryl, haloaryl, e.g. halophenyl wherein the halogen has an atomic weight of 35 to 80, alkenyl, aralkyl, haloalkenyl or cycloalkyl and R is divalent aromatic, aliphatic, e.g. saturated hydrocarbon group of 2 to 20 carbon atoms or divalent alkene group of 4 to 8 carbon atoms or cycloaliphatic group. Preferably $n$ is 1. The $R_1$ groups can be the same or different.

In one aspect of the invention R is —$(R_2Z)mR_2$ where $R_2$ is alkylene of 2 to 8 carbon atoms, Z is oxygen or sulfur and $m$ is an integer of 1 to 3.

The compounds are useful as desiccants for cotton and as intermediates in making polythiophosphonites by reacting with alcohols, mercaptans or phenols, e.g. one mole of 1,6-dimercaptohexylene bis(benzene phosphorus chloride) can react with 2 moles of phenol to form diphenoxy 1,6-dimercapto-hexylene bis(benzene phosphonite) or with 2 moles of lauryl mercaptan to form bis-(mercaptolauryl) 1,6 - dimercaptohexylene bis(benzene phosphonite). The polythiophosphonites thus produced are useful as antioxidants for polyethylene, polypropylene, foods, lubricating oils, natural rubber, EPDM rubber, polybutadiene, butadiene-styrene copolymer, butadiene-acrylonitrile copolymer, acrylonitrile-butadiene-styrene terpolymer, (ABS), poly cis isoprene, polyesters, etc. The polythiophosphonites are claimed in Rattenbury and Larrison application Ser. No. 879,143, filed on even date entitled "Polymercapto Polyphosphonites." The entire disclosure of the Rattenbury and Larrison application is incorporated by reference.

The compounds of the present invention are conveniently prepared by reacting a phosphorus dichloride of the formula

with a compound having the formula HSRSH. When $n$ is one there is employed 2 moles of

and 1 mole of HSRSH. When $n$ is 2 to 10, the following mole ratios should be used

| $n$ | X | HSRSH |
|---|---|---|
| 2 | 3 | 2 |
| 3 | 4 | 3 |
| 4 | 5 | 4 |
| 5 | 6 | 5 |
| 6 | 7 | 6 |
| 7 | 8 | 7 |
| 8 | 9 | 8 |
| 9 | 10 | 9 |
| 10 | 11 | 10 |

If a mixture of

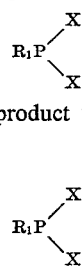

compounds is used then the product will have mixed $R_1$ groups while if only a single compound is used the product will have only one type of $R_1$ group.

As examples of compounds there can be employed methane phosphorus dichloride, ethane phosphorus dichloride, ethane phosphorus dibromide, propane phosphorus dichloride, butane phosphorus dichloride, 2-methylpropane phosphorus dichloride, pentane phosphorus dichloride, 2-methylbutane phosphorus dichloride, 3-methylbutane phosphorus dichloride, 2,2 - dimethylpropane phosphorus dichloride, hexane phosphorus dichloride, heptane phosphorus dichloride, octane phosphorus dichloride, isooctane phosphorus dichloride, 2-ethylhexane-phosphorus dichloride, decane phosphorus dichloride, decane phosphorus dibromide, isodecane phosphorus dichloride, dodecane phosphorus dichloride, hexadecane phosphorus dichloride, octadecane phosphorus dichloride, eicosane phosphorus dichloride, 2 - chloroethane phosphorus dichloride, 3-chloropropane phosphorus dichloride, 2-chloropropane phosphorus dichloride, 4-chlorobutane phosphorus dichloride, 6-chlorohexane phosphorus dichloride, 10-chlorodecane phosphorus dichloride, 18 - chlorooctadecane phosphorus dichloride, 20-chloroeicosane phosphorus dichloride, 2-propene phosphorus dichloride, 9-octadecene phosphorus dichloride, 1-naphthalene phosphorus dichloride, 2-naphthalene phosphorus dichloride, 2-butene phosphorus dichloride, 4-pentene phosphorus dichloride, 2-bromoethane phosphorus dichloride, 4 - bromobutane phosphorus dichloride, benzene phosphorus dichloride, benzene phosphorus dibromide, 2-methylbenzene phosphorus dichloride, 3-methylbenzene phosphorus dichloride, 4-methylbenzene phosphorus dichloride, 4-butylbenzene phosphorus dichloride, 4-octylbenzene phosphorus dichloride, 2-dodecylbenzene phosphorus dichloride, 4-nonylbenzene phosphorus dichloride, 2,4,6-trimethylbenzene phosphorus dichloride, 2-chlorobenzene phosphorus dichloride, 2,6-dimethylbenzene phosphorus dichloride, 4-chlorobenzene phosphorus dichloride, 3-bromobenzene phosphorus dichloride, 2,4-dichlorobenzene phosphorus dichloride, 3-bromobenzene phosphorus dibromide, 2-chloro-4-methylbenzene phosphorus dichloride, phenylmethane phosphorus dichloride, cyclohexane phosphorus dichloride, cyclopentane phosphorus dichloride, 4-methylcyclohexane phosphorus dichloride.

Examples of compounds having the formula HSRSH are 1,2-dimercapto ethane,
1,3-dimercaptopropane,
1,2-dimercaptopropane,
1,4-dimercaptobutane,
1,5-dimercaptopentane,
1,6-dimercaptohexane,
1,8-dimercaptooctane,
2,3-dimercaptopentadecane,
1,15-dimercaptopentadecane,
1,6-dimercapto eicosane,
1,20-dimercaptoeicosane,
1,4-dimercapto-2-butene,
1,8-dimercapto-2-octene,
dimercapto ethyl ether,
dimercaptopropyl ether,
dimercapto diethyl sulfide,
dimercapto dipropyl sulfide,
dimercapto tetraethylene glycol,
dimercapto dipropylene glycol,
dimercapto tripropylene glycol,
bis(mercaptooctyl ether,
bis(mercaptooctyl) thioether,
2,9-p-methane dithiol,
dimercapto α-terpinene,
dimercapto phellandrene,
dimercapto sylvestrene,
2,5-dimercaptopyridine,
dimercaptothiophene,
dimercapto-p-dioxane,
dimercapto xylene,
1,3-dimercapto 2-methylbenzene,
1,4-dimercapto-2-methylbenzene,
p-dimercaptobenzene,
1,4-dimercaptocyclohexane,
1,4-dimercapto-2-methylcyclohexane,
isopropylidene bis(4-mercaptobenzene),
methylene bis(4-mercaptobenzene),
ethylidene bis(4-mercaptobenzene),
isopropylidene bis(4-mercaptocyclohexane),
methylene bis(4-mercaptocyclohexane),
ethylidene bis(4-mercaptocyclohexane),
1,4-bis(mercaptomethyl) benzene,
1,3-bis(mercaptomethyl) benzene,
1,4-bis(mercaptomethyl)cyclohexane,
1,3-dimercaptocyclopentane,
1,8-dimercapto naphthalene.

Examples of chloro thiophosphonites within the present invention are 1,2-dimercaptoethylene bis(ethane phosphorus chloride),
1,2-dimercaptoethylene bis(ethane phosphorus bromide),
1,2-dimercaptoethylene bis(hexane phosphorus chloride),
1,2-dimercaptoethylene bis(dodecane phosphorus chloride),
1,2-dimercaptopropylene bis(butane phosphorus chloride),
1,3-dimercaptopropylene bis(isopropane phosphorus chloride),
1,6-dimercaptohexylene bis(methane phosphorus chloride),
1,6-dimercaptohexylene bis(ethane phosphorus chloride),
1,6-dimercaptohexylene bis(ethane phosphorus bromide),
1,6-dimercaptohexylene bis(trimethylmethane phosphorus chloride),
1,6-dimercaptohexylene ethane phosphorus chloride propane phosphorus chloride,
1,6-dimercaptohexylene bis(1-methylpropane phosphorus chloride),
1,6-dimercaptohexylene bis(hexane phosphorus chloride),
1,6-dimercaptohexylene bis(2-ethylhexane phosphorus chloride),
1,6-dimercaptohexylene bis(dodecane phosphorus chloride,
1,6-dimercaptohexylene bis(decane phosphorus chloride),
1,6-dimercaptohexylene novane phosphorus chloride decane phosphorus chloride,
1,6-dimercaptohexylene bis(hexadecane phosphorus chloride),
1,6-dimercaptohexylene bis(isodecane phosphorus chloride),
1,6-dimercaptohexylene bis(octadecane phosphorus chloride),
1,6-dimercaptohexylene bis(eicosane phosphorus chloride),
1,6-dimercaptohexylene bis(phenylmethane phosphorus chloride),
1,6-dimercaptohexylene bis(cyclohexane phosphorus chloride),
1,6-dimercaptohexylene bis(4-methyl cyclohexane phosphorus chloride),
1,6-dimercaptohexylene bis(2-chloroethane phosphorus chloride),
1,6-dimercaptohexylene bis(3-chloropropane phosphorus chloride),
1,6-dimercaptohexylene bis(α-terpinene phosphorus chloride),
1,6-dimercaptohexylene bis(4-bromobutane phosphorus chloride),
1,6-dimercaptohexylene bis(benzene phosphorus chloride),
1,6-dimercaptohexylene bis(benzene phosphorus bromide),
1,6-dimercaptohexylene decane phosphorus chloride benzene phosphorus chloride,
1,6-dimercaptohexylene bis(4-methylbenzene phosphorus chloride),
1,6-dimercaptohexylene bis(2,6-dimethylbenzene phosphorus chloride),
1,6-dimercaptohexylene bis(2,4,6-trimethylbenzene phosphorus chloride),
1,6-dimercaptohexylene bis(4-butylbenzene phosphorus chloride),
1,6-dimercaptohexylene bis(2-octylbenzene phosphorus chloride),
1,6-dimercaptohexylene bis(4-nonylbenzene phosphorus chloride),
1,6-dimercaptohexylene bis(3-dodecylbenzene phosphorus chloride),
1,6-dimercaptohexylene bis(2-bromobenzene phosphorus chloride),
1,6-dimercaptohexylene bis(4-chlorobenzene phosphorus chloride),
1,6-dimercaptohexylene bis(2-chloropropene phosphorus chloride),
1,4-dimercaptobutylene bis(dodecane phosphorus chloride),
1,6-dimercaptoeicosanylene bis(benzene phosphorus chloride),
1,20-dimercaptoeicosanylene bis(decane phosphorus chloride),
β,β'-dimercapto ethyl ether bis(4-nonylbenzene phosphorus chloride), 3,3'-dimercaptopropyl ether bis(dodecane phosphorus chloride),
1,4-dimercapto butene-2 bis(isodecane phosphorus chloride),
1,6-dimercaptohexylene bis(2-propene phosphorus chloride),
1,6-dimercaptohexylene bis(9-octadecene phosphorus chloride),
2,2'-dimercaptoethyl thioether bis(hexadecane phosphorus chloride),
dimercaptodiethylene glycol bis(isodecane phosphorus chloride),
dimercapto propylene glycol bis(benzene phosphorus chloride),
dimercapto tetraethylene glycol bis(4-nonylbenzene phosphorus chloride),
omega, omega' dimercaptooctyl ether bis(dodecane phosphorus chloride,
omega, omega' dimercaptooctyl thioether bis(dodecane phosphorus chloride),
2,9-dimercapto-p-menthylene bis(dodecane phosphorus chloride),
2,9-dimercapto-p-menthylene bis(benzene phosphorus chloride),
2,9-dimercapto-p-menthylene bis(naphthalene phosphorus chloride),
2,5-dimercaptopyridine bis(dodecane phosphorus chloride),
2,5-dimercaptothiophene bis(octane phosphorus chloride),
p-dimercaptophenylene bis(dodecane phosphorus chloride),
p-dimercaptophenylene bis(o-octylbenzene phosphorus chloride),
2-methyl-1,4-dimercaptophenylenebis(dodecane phosphorus chloride),
1,4-dimercaptocyclohexylene (hexadecane phosphorus chloride),
isopropylidene bis(4-mercaptobenzene) bis(dodecane phosphorus chloride),
isopropylidene bis(4-mercaptobenzene) bis(benzene phosphorus chloride),
1,4-bis(mercaptomethyl( benzene bis(dodecane phosphorus chloride),
1,4-bis(mercaptomethyl) cyclohexane bis(benzene phosphorus chloride),
1,3-dimercaptocyclopentylene bis(dodecane phosphorus chloride),
1,8-dimercaptonaphthalene bis(benzene phosphorus chloride),
bis(1,6-hexylenedimercapto) tris(dodecane phosphorus chloride),
bis(1,6-hexylenedimercapto) tris(benzene phosphorus chloride),
bis(1,6-hexylenedimercapto) tris(benzene phosphorus bromide),
bis(1,2-ethylenedimercapto) tris(octadecane phosphorus chloride),
bis(2,9-p-menthylenedimercapto) tris(dodecane phosphorus chloride),
bis(β,β'-dimercaptoethyl ether) tris(decane phosphorus chloride),
tris(1,6-hexylenedimercapto) tetrakis(dodecane phosphorus chloride),
tetrakis(1,6-hexylenedimercapto) pentakis(benzene phosphorus chloride),
nonakis(2,9-p-menthylene dimercapto) decakis-(dodecane phosphorus chloride),
1,4-dimercaptobutylene bis(butane phosphorus chloride),
1,8-dimercaptooctylene bis(butane phosphorus chloride).

Unless otherwise indicated, all parts and percentages are by weight.

EXAMPLE 1

1,6-dimercaptohexylene bis(benzene phosphorus chloride)

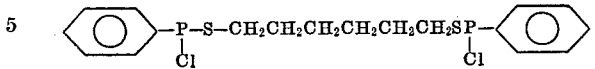

150 grams (1 mole) of 1,6-hexanedithiol were charged to a 1,000 ml. flask and 358 grams (2 moles) of benzene phosphorus dichloride were added from a dropping funnel. 50 minutes were required for the addition. The temperature ranged between 75–90° C. The temperature was then slowly increased to 120° C. and then HCl removed through a water aspirator. The net weight of the liquid product was 439 grams.

R.I. $n_D^{25}$—1.6362
Phosphorus—14.1%
Sulfur—14.6%
Chlorine—8.1%

EXAMPLE 2

The procedure of Example 1 was repeated using 2 moles of decane phosphorus dichloride to produce 1,6-dimercaptohexylene bis(decane phosphorus chloride).

EXAMPLE 3

The procedure of Example 1 was repeated using 1 mole of 1,2-ethanedithiol to produce 1,2-dimercaptoethylene bis(benzene phosphorus chloride).

EXAMPLE 4

The procedure of Example 1 was repeated using 1 mole of 2,9-para-menthanedithiol to produce 2,9-dimercapto-p-menthylene bis(benzene phosphorus chloride).

EXAMPLE 5

The procedure of Example 1 was repeated using 1 mole of β,β'-dimercapto ethyl ether to produce β,β'-dimercapto ethyl ether bis(benzene phosphorus chloride).

EXAMPLE 6

2 moles of 1,6-hexanedithiol and 3 moles of benzene phosphorus dichloride were reacted as in Example 1 to produce bis(1,6 - hexylenedimercapto) tris(benzene phosphorus chloride).

What is claimed is:

1. A compound having the formula

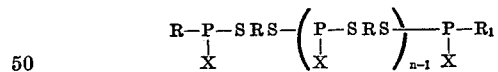

where n is an integer of 1 to 10, X is chlorine or bromine, $R_1$ is alkyl to 1 to 20 carbon atoms, haloalkyl of up to 20 carbon atoms, phenyl, alkylphenyl having up to 18 carbon atoms in the alkyl group; naphthyl, halophenyl wherein the halogen has an atomic weight of 35 to 80, chloro methyl phenyl, alkenyl of 3 to 18 carbon atoms, benzyl, cycloalkyl having 5 to 6 carbon atoms in the ring, chloropropenyl and R is aliphatic saturated hydrocarbon of 2 to 20 carbon atoms, divalent alkene group of 4 to 8 carbon atoms, —($R_2$Z)$mR_2$— where $R_2$ is alkylene of 2 to 8 carbon atoms, Z is oxygen or sulfur, and m is an integer of 1 to 3, cycloalkylene having 5 to 6 carbon atoms in the ring, arylene wherein the arylene group has 6 to 10 carbon atoms in the ring, alkylidene bis phenyl having 1 to 3 carbon atoms in the alkylidene group, and alkylidene bis cyclohexyl having 1 to 3 carbon atoms in the alkylidene group.

2. A compound according to claim 1 where X is chlorine, $R_1$ is alkyl of 1 to 20 carbon atoms, phenyl, alkylphenyl having up to 18 carbon atoms in the alkyl group, naphthyl, halophenyl where the halogen has an atomic weight of 35 to 80, alkenyl of 3 to 18 carbon atoms, benzyl or cycloalkyl having 5 to 6 carbon atoms in the ring.

3. A compound according to claim 2 wherein R is alkylene of at least two carbon atoms, cycloalkylene or arylene.

4. A compound according to claim 3 where $n$ is 1.

5. A compound according to claim 4 wherein R is alkylene.

6. A compound according to claim 4 wherein R is cycloalkylene.

7. A compound according to claim 3 where $n$ is two.

8. A compound according to claim 2 where $R_1$ is phenyl.

9. A compound according to claim 2 wherein R is $$-(R_2Z)_m R_2-$$

where $R_2$ is alkylene of two to light carbon atoms, Z is oxygen or sulfur and $m$ is an integer of one to three.

References Cited

Dietche, "Index Chemicus," vol. 26, No. 8, Aug. 15, 1967, #83826.

JOSEPH REBOLD, Primary Examiner

A. H. SUTTO, Assistant Examiner

U.S. Cl. X.R.

260—290 R, 329 P, 340.6, 609 A, 609 D, 929, 930, 960